United States Patent

[11] 3,596,194

[72] Inventor William A. Dambrackas
Trevose, Pa.
[21] Appl. No. 13,258
[22] Filed Feb. 20, 1970
[45] Patented July 27, 1971
[73] Assignee Ultronic Systems Corp.

[54] ELECTRONIC SIGNAL CONVERTER
2 Claims, 2 Drawing Figs.

[52] U.S. Cl. 329/104, 307/232, 307/321, 329/110, 329/129, 329/166
[51] Int. Cl. H03d 3/10
[50] Field of Search 329/104, 110, 112, 129, 166, 130; 307/321, 232, 233

[56] References Cited
UNITED STATES PATENTS

| | | | |
|---|---|---|---|
| 2,676,204 | 4/1954 | Snijders | 329/166 X |
| 2,774,932 | 12/1956 | Patton | 329/166 X |
| 3,087,106 | 4/1963 | Baude et al. | 307/321 X |
| 3,421,027 | 1/1969 | Maynard et al. | 307/321 X |

*Primary Examiner*—Alfred L. Brody
*Attorneys*—Norman J. O'Malley and Theodore C. Jay, Jr.

ABSTRACT: Apparatus used in transforming standard neutral or bipolar teletypelike signals as received from a telephone line into corresponding signals at different power levels for use with electronic equipment. The apparatus displays a variable impedance having first and second sharply different values which are attained as the received signal changes state. A demodulator coupled to the apparatus and responsive to the different impedance values produces the desired corresponding signals at desired power levels for use in the equipment.

INVENTOR.
WILLIAM A. DAMBRACKAS
BY

ELECTRONIC SIGNAL CONVERTER

BACKGROUND OF THE INVENTION

In many information handling systems, neutral or bipolar teletypelike electrical signals must be transferred from a telephone line to electronic equipment utilizing integrated circuits as for example when the signals are to be converted to visually displayed alpha-numeric symbols. The electrical characteristics of line and equipment are dissimilar whereby the power level of the signals on the line must be changed prior to being supplied to the equipment to prevent improper functioning of the equipment. It is conventional to use electromechanical devices such as relays for this purpose.

I have devised a new type apparatus (which I call an electronic signal converter) which can be substituted for relays and the like. My apparatus can be produced much less expensively and is characterized by an inherently long operating life. Since my apparatus has no moving parts, it requires little or no servicing. It is adapted to handle data at speeds in excess of that obtainable with electromechanical devices. All these advantages are obtained in a novel manner through the use of apparatus for sensing the presence and direction of differential line currents while providing high common mode noise rejection and high voltage isolation between the line and the equipment. Since my apparatus appears across the line as a low impedance, it can be added thereon in series with existing circuitry without appreciably changing the resistance across the line.

SUMMARY OF THE INVENTION

The neutral or bipolar teletypelike incoming signals are binary in type, and thus are characterized by two mutually exclusive states. These signals are supplied serially between two input terminals. Two circuit branches are connected in parallel across the two input terminals. Each branch includes two serially connected rectifiers and a separate output terminal connected to the junction of the two rectifiers. All rectifiers in both branches are poled in the same sense. A separate rectifier poled in reverse sense is also connected across the input terminals. The primary winding of a transformer is connected between the two output terminals. The secondary winding of the transformer is adapted for connection to a demodulator or the like.

The two different signal states are referred to as marks and spaces respectively. When a mark is present, a forward current flows easily through both branches while only a small reverse current passes through the oppositely poled separate rectifier. When a space is present, represented by direct current of opposite polarity (when a bipolar signal is used) or by substantially zero current (when a neutral signal is used), the separate rectifier conducts in the forward direction while the rectifiers in the branches pass only the small reverse current.

However, the potential at the junction of the rectifiers in the one branch, i.e. at one output terminal, remains essentially the same as that at the other output terminal, regardless of forward current or reverse current flow conditions. As a result, essentially zero current flows through the primary winding of the transformer whether a mark or space is present. Nevertheless, the reflected impedance, as developed across the secondary winding, is low when a mark is present and is high when a space is present.

When an alternating voltage of fixed magnitude is applied through a series impedance to the secondary winding, a variable alternating current will flow in this winding. This current is characterized by a relatively large amplitude when the reflected impedance is low and is characterized by a relatively low amplitude when the reflected impedance is high. In this manner, the binary teletypelike signals are converted to alternating current signals differing in amplitude, without use of relays or other electromechanical elements. The demodulator or other means coupled to the secondary of the transformer easily converts the alternating signals to desired corresponding signals at different power levels as required by the electronic equipment.

DETAILED DESCRIPTION OF PREFERRED EMBODIMENTS

Figure 1:
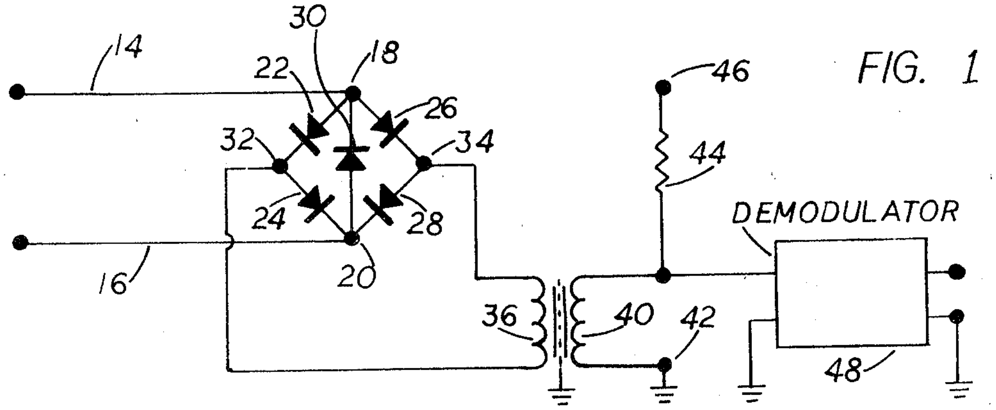
FIG. 1 is a circuit diagram of my invention.
Figure 2:
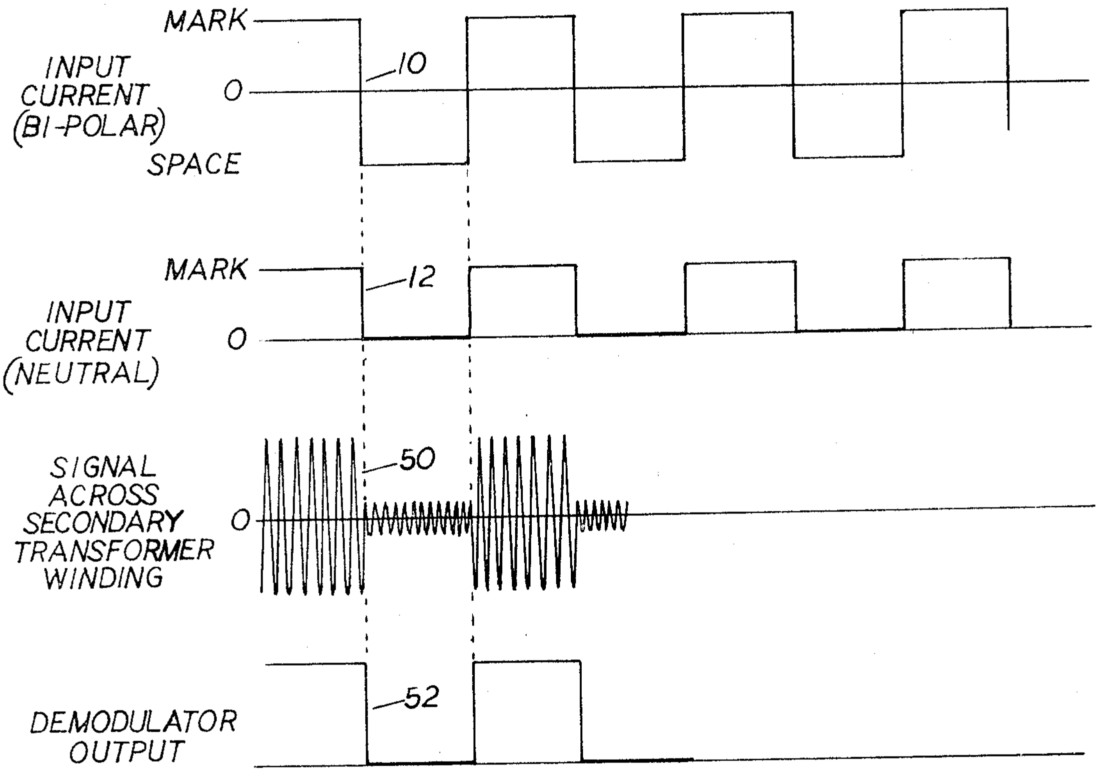
FIG. 2 shows the waveforms of various signals employed in the circuit of FIG. 1.

Referring now to FIGS. 1 and 2, bipolar current signals 10 or neutral current signals appear between telegraph lines 14 and 16 and are applied between input terminals 18 and 20.

A first branch containing series connected rectifiers 22 and 24 is connected between terminals 18 and 20. A second branch containing series connected rectifiers 26 and 28 is also connected between these terminals. A separate rectifier 30 is also connected between these terminals. All rectifiers 22, 24, 26 and 28 are poled in the same sense which is the reverse of the poling of rectifier 30.

A first output terminal 32 is connected to the junction of rectifiers 22 and 24. A second output terminal 34 is connected to the junction of rectifiers 6 and 28.

The primary winding 36 of transformer 38 is connected between terminals 32 and 34. The secondary winding 40 of this transformer is connected between a point 42 of ground potential and a resistance 44. Alternating voltage of fixed amplitude and frequency is applied between terminal 46 (to which resistance 44 is connected) and ground. The winding 40 is connected to the input of a demodulator 48. The output of demodulator 48 is supplied to the electronic equipment using integrated circuits previously referred to.

The signals supplied to the telephone lines define marks and spaces as shown. The system described above works as follows: the rectifiers in the branches are reverse biased and pass only reverse current, the individual rectifier conducts in the forward direction and only a very small voltage drop is produced thereacross. When the individual rectifier is reverse biased, the branch rectifiers all conduct in the forward and only a very small voltage drop appears thereacross Thus, the impedance appearing across the input terminals is always low since the voltage appearing therebetween is always low.

When the branch rectifiers are conducting in the forward direction; each output terminal is connected to the input terminals by a very low impedance, a forward conducting rectifier. However, when the branch rectifiers are reverse biased, each output terminal is connected to the input terminals by a very high impedance, a reverse conducting rectifier. Since the primary winding of the transformer is connected between the output terminals, a reflected impedance as developed across the secondary winding which is very low when the branch rectifiers are conducting in the forward direction and is very high when these rectifiers are conducting in the reverse direction. The resultant alternating current flowing through the secondary winding is shown at 50. It will be seen that this current has a large amplitude when a mark is received and has a small amplitude when a space is received.

Demodulator 48, which can take the form of an amplitude modulated detector, strips the envelope from current 50 to supply this envelope as an input signal 52 to the utilizing equipment as shown.

While my invention has been described with particular reference to the drawings, my protection is to be limited only by the terms of the claims that follow.

What I claim is:

1. A signal converter including a pair of input terminals adapted to receive a bipolar or neutral signal comprising in combination:

first and second branches connected in parallel across the input terminals, each branch containing two series connected rectifiers, all rectifiers in the branches being poled in the same sense;

a separate rectifier connected between the input terminals and poled in opposite direction to the branch rectifiers; and a transformer having primary and secondary windings, one end of the primary winding being connected to the junction of the rectifiers in the first branch, the other end of the primary winding being connected to the junction of the rectifiers in the second branch whereby the reflected impedance appearing across the secondary winding exhibits a low value when the branch rectifiers conduct in the forward direction and exhibits a high value when the separate rectifier conducts in the forward direction a source of alternating current of predetermined amplitude and frequency, an impedance and means to supply said current from said source through said impedance and then through said secondary winding.

2. The combination as set forth in claim 1 further including a demodulator coupled at its input to the secondary winding.